United States Patent Office 3,527,596
Patented Sept. 8, 1970

3,527,596
POROUS ZINC GRANULES
Walter L. Butterfield, Whippany, N.J., assignor, by mesne assignments, to The Celotex Corporation, a corporation of Delaware
No Drawing. Filed Apr. 27, 1967, Ser. No. 634,140
Int. Cl. B22f 9/00; B44d 1/094
U.S. Cl. 75—.5
4 Claims

ABSTRACT OF THE DISCLOSURE

A granulated zinc metal of relative high porosity and low density is provided. These porous zinc granules are characterized by their relatively ready susceptibility to corrosion when exposed to the atmosphere. The zinc corrosion products are biodeterioration inhibitors which are effective against the destructive growth of various organisms.

---

The invention relates to a novel composition comprising essentially particulated zinc metal characterized by its relatively high porosity and low density or greater bulk. In particular, these zinc particles are relatively easily attacked upon exposure to the atmosphere to produce corrosion products. This zinc containing product, produced gradually as corrosion occurs, is effective to resist the growth of various organisms which come into contact with it and which would overwise cause biodeterioration of materials, e.g. such as the unsightly darkening and/or discoloration of roof shingles, the particulars of which are more fully described in the pending U.S. patent application Ser. No. 596,197, filed on Nov. 22, 1966.

It is an object of this invention to provide a novel particulated zinc metal product whose corrosion products, as the metal is exposed to weathering, will effectively inhibit the growth of various microorganisms.

It is a more specific object of the invention to provide a zinc metal granular product which is characterized by a relatively greater porosity and lower density and which when exposed to the atmosphere gradually corrodes at a rate greater than the more dense metallic zinc, to provide a long-lasting supply of microorganism poisoning substance which is effective, for example, over a period of years to protect a surface against the growth of various microorganisms.

Additional objects and advantages will become apparent to one skilled in the art from the definitive description provided hereinbelow.

Broadly stated, the invention comprises providing a granulated zinc particle which is usefully adaptable as surface covering and whose function is that of an inhibitor to safeguard against biodeterioration. This effect may be obtained, for example, as noted in patent application Ser. No. 596,197, either by a uniform blend of these zinc granules, which are substantially the same size as the mineral granules in the surface composition of roof shingles exposed to the weather, or by applying a weather corrodable ridge sheet or strip of material having applied thereto the zinc particles which, as corrosion takes place, washes the corrosion product, i.e. the microorganism growth-inhibiting substance, downward over the roof surface.

As noted in pending U.S. patent application Ser. No. 596,197, the dark stains common on roofs, particularly in the Southeastern part of the United States, and in other humid areas, are the result of microorganism growth starting in a few colonies and ultimately covering the entire roof. While the use of biodeterioration inhibitors of various kinds added to the surface covering, e.g. asphalt shingles, can be expected to be effective to inhibit growth of the airborne microorganisms, thus preventing the widespread unsightly darkening, the problem is one of providing an inhibitor which is (a) effective, i.e. provides an adequate supply of microorganism growth preventative, and (b) is gradual but long-lasting, i.e. provides a supply which lasts for many years without replenishment. These criteria are met by the porous zinc metal particles of the invention, which furnish a long-lasting "reservoir" of growth inhibitor resulting from the corrosion of the zinc particles and whose inhibiting effect is kept active by weathering action on the exposed granules.

The granules of zinc of the invention, as noted in the mentioned U.S. patent application Ser. No. 596,197, find particular utility as surfacing material for roof shingles. They are easily introduced into the shingle making process generally employing the same technology used in handling mineral granules. Moreover, these zinc particles and their corrosion products, except as against microorganisms, are essentially non-toxic and are free of hazards at any stage in the handling or manufacturing of products to which the granules are applied. The corrosion products of zinc are also light in color which is important in environments where darkening or staining is to be avoided.

Preparation of the granules of the present invention will be further described by the following specific example. It will be understood, however, that although this example may describe in detail certain preferred operating conditions of the invention, it is given primarily for purpose of illustration only and the invention in its broader aspects is not limited thereto.

EXAMPLE

A thin stream, approximately one-eighth inch in diameter, of molten zinc containing minor amounts, e.g. not more than about 2% each of lead and tin, the remainder being zinc, was discharged into a flat flowing stream of water about ½ inch thick and under 50–90 p.s.i. of pressure. As the molten metal contacts the water, the sudden chilling of the metal effectively imparts porosity to the metal particles, i.e. relatively irregular granules are formed. The particles are accumulated in an inclined collection tank and screened to remove fines and occasional oversized particles as follows:

U.S. STANDARD SIEVE SCREEN SIZE #11 GRADING

| Screen size | Opening, mm. | Pass | Held on | Weight, percent |
|---|---|---|---|---|
| #8 | 2.38 | | 8 | 0 |
| #12 | 1.68 | 8 | 12 | 0–3 |
| #16 | 1.19 | 12 | 16 | 25–40 |
| #20 | 0.84 | 16 | 20 | 30–45 |
| #30 | 0.59 | 20 | 30 | 10–30 |
| #40 | 0.42 | 30 | 40 | 0–10 |
| | | 40 | | 0–2 |

The sieved particles have an $H_2O$ displacement of 6.2 g./cc., an Air Pycnometer value of 7.37 g./cc., and a free fall density for bulk handling of 117 lbs. per cubic foot.

In subsequent runs, it is seen that particle size may be modified by controlling water stream pressure. Porosity may be effected to some extent by the temperature of the streams, as well, for example, by injecting steam into the water stream contiguous to the juncture of the molten zinc into the water stream.

It will be apparent that various modifications may be effected in the details presented herein without departing from the scope of the invention. For example, variations in techniques may be adapted for imparting the desired porosity and particle size within the purview of the invention. Accordingly, the several details disclosed for the preparation of the zinc particles are not to be construed as placing limitations on the invention.

I claim:
1. Metallic zinc in discrete granular form, at least 90% of which have a particle size between about 0.3 mm. and about 3.0 mm. and having a composition which is characterized by relative porosity and low density of not greater than about 7.5 g./cc. by $H_2O$ displacement.
2. The metallic zinc particles of claim 1 wherein at least 98% have a particle size of between 0.4 mm. and 2.5 mm.
3. The porous metallic zinc particle of claim 1 characterized by a density of not greater than about 6.5 g./cc. by $H_2O$ displacement.
4. A metallic zinc alloy in discrete granular form, at least 90% of which have a particle size of between 0.3 mm. and about 3.0 mm. and having a composition comprising metallic zinc and an effective amount of but not exceeding about 2% of a metal selected from the group consisting of lead and tin and mixtures of lead and tin.

References Cited
UNITED STATES PATENTS 1,090,661    3/1914    Urquhart _____ 75—0.5

L. DEWAYNE RUTLEDGE, Primary Examiner

W. W. STALLARD, Assistant Examiner

U.S. Cl. X.R.

117—100, 160; 264—11, 14